United States Patent
Bank et al.

(10) Patent No.: US 6,267,508 B1
(45) Date of Patent: Jul. 31, 2001

(54) SLIDING BEARING HAVING MULTILAYER LEAD-FREE OVERPLATE AND METHOD OF MANUFACTURE

(75) Inventors: Brian L. Bank, Hartland; James R. Toth, Ann Arbor, both of MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/433,451

(22) Filed: Nov. 4, 1999

(51) Int. Cl.⁷ ....................................................... F16C 33/06
(52) U.S. Cl. ............................ 384/276; 384/294; 384/912
(58) Field of Search ..................... 384/273, 276, 384/288, 294, 625, 912

(56) References Cited

U.S. PATENT DOCUMENTS

| | | |
|---|---|---|
| 3,077,285 | 2/1963 | Budininkas . |
| 3,215,513 | 11/1965 | Schaefer . |
| 3,522,974 | 8/1970 | Polti . |
| 3,623,205 | 11/1971 | Scott . |
| 4,474,861 | 10/1984 | Ecer . |
| 4,553,856 | 11/1985 | Bierlein . |
| 4,836,695 | 6/1989 | Baureis . |
| 4,889,435 | 12/1989 | Gojon . |
| 4,999,257 | 3/1991 | Imai . |
| 5,056,936 | 10/1991 | Mahrus . |
| 5,056,937 | 10/1991 | Tanaka . |
| 5,185,216 | 2/1993 | Tanaka . |
| 5,209,578 | 5/1993 | Eastham . |
| 5,434,012 | 7/1995 | Tanaka . |
| 5,489,487 | 2/1996 | Tanaka . |
| 5,601,371 | 2/1997 | Koroschetz . |
| 5,665,480 | 9/1997 | Tanaka . |

*Primary Examiner*—Lenard A. Footland
(74) *Attorney, Agent, or Firm*—Reising, Ethington, Barnes, Kisselle, Learman & McCulloch, PC

(57) ABSTRACT

A multilayer engine bearing (10) includes a steel backing (12) having a liner (18) of bearing metal of either copper-lead or aluminum alloys formed on the backing (12) to define a base lining member (20) of the bearing (10). A multilayer overplate (22, 122) is formed on the base lining member (20,120) and includes multiple lead-free soft layers (24,124) separated by lead-free hard layers (26,126). The relative thicknesses of the overplate layers may be controlled to provide a macro hardness gradient across the thickness of the overplate (122) such that, for example, the overplate (122) may be softer near its top region (130) as compared to its bottom region (132).

12 Claims, 1 Drawing Sheet

SLIDING BEARING HAVING MULTILAYER LEAD-FREE OVERPLATE AND METHOD OF MANUFACTURE

BACKGROUND OF THE INVENTION

1. Technical Field

This invention relates to multilayer sliding bearings of the type having a metal backing, a liner of bearing metal and a relatively soft metallic overlay.

2. Related Prior Art

Multilayer sliding bearings are typically used in high-load engine applications for journaling the crankshaft, connecting rods, and the like and include a rigid metal backing of steel on which a lining of bearing metal of either copper-lead or aluminum alloy is applied, over which a running layer of a relatively softer metal is overplated usually in the form of a single layer of lead-tin-copper alloy having a thickness of about 25 $\mu$m. A nickel diffusion barrier or copper bonding layer is often interposed between the lining and overplate to prevent the tin of the overplate from diffusing into the bearing liner. As a final step, the bearing is typically coated with a micro-thin layer of tin or lead-tin flash plating, giving the bearing a bright, aesthetically pleasing appearance and providing a level of corrosion protection.

The flash plating present on the concave running surface of the bearing is quickly dissipated during the initial engine break-in period.

In service, such multilayer sliding bearings are subjected to high dynamic loading that varies in magnitude and direction due to the inertial loads applied by the piston and connecting rod mechanism and by the cylinder gas. The soft overplate layer enables the bearing surface to continually change and conform under high load forces to any misalignments or changes in profile or loading of the member being journaled, so that the loads are distributed across a greater surface area of the bearing. In addition to its conformability, the overplate also has the characteristic of embedibilty, which enables the overplate to embed any foreign hard particles of dirt and/or metal that may come between the bearing surface and the member being journaled to protect the bearing and member from excessive wear or damage.

It is generally accepted that conformability and embedibilty characteristics are dependent on overplate thickness, with a thicker overplate being preferred (i.e., on the order of 25 $\mu$m or more). It is also generally known that as the thickness of the overplate increases, so does the susceptibility of the overplate to fatigue in which the overplate surface fractures under load. Resistance to fatigue cracking requires that the bearing surface exhibit sufficient tensile strength to enable it to undergo minor configuration changes without cracking. Thus, it is necessary to balance the competing properties of conformability and embedibilty with fatigue resistance when designing an engine bearing, particularly one that is subjected to high dynamic loading.

For many high load engine applications, a 25 $\mu$m overplate of lead-tin-copper has been found to exhibit good conformability and embedibilty while possessing good fatigue resistance. However, as the output and efficiency of engines continually increases, so does the dynamic loads placed on the crank shaft and connecting rod bearings, increasing the potential for bearing fatigue. While greater fatigue resistance can be achieved by simply decreasing the thickness of the conventional single layer lead-tin-copper overplate to load the 25 $\mu$m thickness, it is at the cost of the conformability and embedibilty characteristics.

In addition to the demands on bearings due to increased loading, it is environmentally advantageous to reduce or eliminate when possible the use of heavy metals, and particularly lead in sliding bearings. U.S. Pat. No. 5,056,936 discloses a sliding bearing having a multilayer overplate construction that employs conventional lead-containing alloys, namely lead-tin-copper as one of the layer materials.

Thus, their exist they need in the industry for an improved multilayer sliding bearing that can operate under extreme high dynamic loading conditions while exhibiting good fatigue resistance as well as good conformability and embedibilty characteristics without the usage of lead-containing alloys in the overplate.

SUMMARY OF THE INVENTION

According to the invention, a multilayer sliding bearing is provided a comprising a base lining member having a rigid metal backing and a lining of bearing metal formed on the backing, and is characterized by a lead-free multilayer overplate comprising a plurality of alternating soft and hard micro-thin overplate layers of lead-free metal materials electroplated onto the base lining member.

The overplate preferably has an overall thickness in the range of about 10–20 $\mu$m, and the individual layers each have a thickness equal to at least half or less of the overall thickness of the overplate.

The multilayer overplate of the invention has the advantage of providing a composite overplate for a sliding bearing having good fatigue resistance as well as good conformability and embedibility characteristics using lead-free metal layers. By controlling the selection of material and the relative thicknesses of the multiple layers of the lead-free overplate, the invention enables a controlled hardness gradient to be developed in the overplate, which further enhances the above properties. According to a particular embodiment of the invention, the alternating soft and hard layers have varying relative thicknesses such that the overall macro hardness of the overplate is softer adjacent the top running surface of the overplate and is harder near the bottom of the overplate adjacent the bearing liner.

The use of lead-free materials further has the advantage of eliminating from the overplate the presence of heavy metals, and in particularly lead, which is beneficial from a manufacturing, use and reclamation stand point.

BRIEF DESCRIPTION OF THE DRAWINGS

These and other advantages and features of the invention will be readily appreciated as the same becomes better understood by reference to the following detailed description and drawings, wherein.

Figure 1:
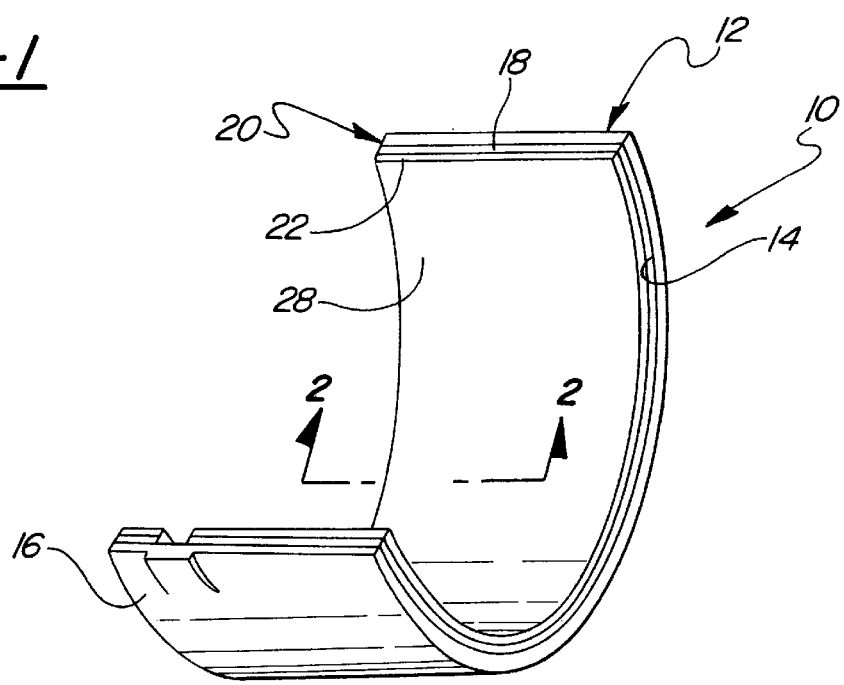
FIG. 1 is a perspective view of a multilayer bearing constructed according to the invention.

A liner of metallic bearing metal 18 is formed on the concave surface 14 of the backing 12 and may be fabricated of conventional materials including copper-lead or aluminum alloys which may be cast or otherwise formed on the inner surface 14 according to known practice. The backing 12 and liner 18 collectively provide a base lining member 20 which forms the foundation for the bearing 10. The liner 20 may also include a thin barrier or bonding layer 21 (i.e. about 1–2 μm thick) of either nickel or copper which may be electroplated onto the liner 18 according to conventional practice to serve as a migration barrier or as a bonding layer for the overplate to be described below.

The construction described thus far with respect to the base lining member 20 is conventional. Where the invention departs from conventional practice is that following the fabrication of the base lining member 20, a multilayer overplate 22 is formed on the base lining member 20 from a plurality of alternating layers of soft and hard lead-free metal, the overplate being shown generally at 22 in FIG. 1 and the alternating soft and hard layers that make up the overplate 22 being shown in detail in the enlarged sectional view of FIG. 2 at 24 and 26, respectively. There are at least three such layers and the thickness of each is about half or less of the overall thickness of the overplate, which preferably is in the range of about 10–20 μm.

Figure 2:
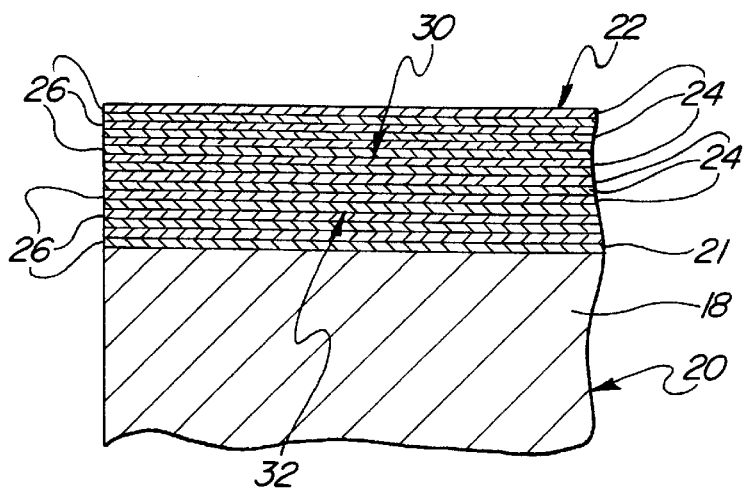
FIG. 2 is a fragmentary cross-sectional view taken generally along lines 2—2 of FIG. 1.

The lead-free material for the soft layers 24 preferably comprises tin or soft lead-free 10 alloys thereof The material for the lead-free hard layers 26 may comprise at least one material selected from the group of materials of nickel, copper, tin-nickel alloy, cobalt, or iron as well as lead-free alloys thereof The soft and hard layers 24, 26 are applied to the liner 18 by electrodeposition. As illustrated in FIG. 2, an initial soft layer 24 is applied to the liner 18 in a first electrodeposition bath. In a separate plating bath, a subsequent hard layer 26 is applied to the initial soft layer 24 and the process repeated to develop the desired number and arrangement of the alternating soft and hard layers 24, 26 to the desired thickness of the overplate 22. In the FIG. 2 embodiment, the lead-free soft and hard layers 24, 26 each have a thickness of about 1 μm and the overplate 22 has an overall thickness of about 15 μm. It will be appreciated that the overplate 22 in the FIG. 2 embodiment has an overall macro hardness that is uniform from top to bottom. In other words, the multiple layers collectively provide the overplate 22 with an overall macro hardness apart from the hardness of the individual layers that is the same in the top region or half of the overplate adjacent the working running surface 28 of the bearing as that of the hardness of the bottom region or half of the overplate 22 adjacent the liner 18 of the bearing 10. Thus, while the individual layers 24, 26 that make up the overplate 22 may be relatively soft and hard and thus vary from layer to layer, the effect of the uniform thicknesses of the layers and their consistent relationship to the adjacent layers provides the overplate 22 with an overall uniform macro hardness that is about the same from top to bottom.

FIG. 2 shows an alternative embodiment of the invention wherein like reference numerals are used to indicate like features with respect to the embodiment of FIG. 2, but are offset by 100. It will be seen from FIG. 3 that the relative thicknesses of the soft and hard layers differ from those of the FIG. 2 embodiment. In the FIG. 3 embodiment, the hard layers 126 in the bottom region 132 of the overplate 122 are relatively thicker than the hard layers 126 in the top region 130. The soft layers 124 disposed between the hard layers 126 are of uniform thickness. The outermost soft layer 124 (at the top of FIG. 3) is preferably thicker than that of the soft layers 124 separating the hard layers 126. The effect of the varying thickness and arrangement of the layers 124, 126 is to provide the overplate 122 with a macro hardness gradient wherein the overplate 122 is relatively soft in the top region 130 and relatively hard in the bottom region 132, as opposed to the FIG. 2 embodiment in which the macro hardness of the overplate is uniform from top to bottom. In the illustrated embodiment of FIG. 3, the outermost (top) soft layer 124 has a thickness in the range of preferably 1–5 μm and more preferably 3–5 μm. The hard layers 126 in the top region 130 preferably have a thickness of about 1 μm and the hard layers 126 in the bottom region 132 preferably have a thickness of about 2 μm. The thicknesses of the soft layers 124 separating the hard layers 126 is preferably about 1–2 μm and preferably uniform in thickness among such soft layers 124.

Figure 3:
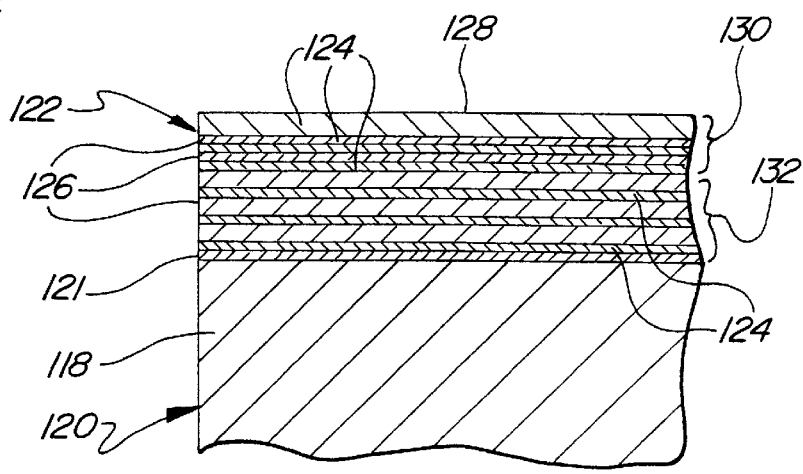
FIG. 3 is a view like FIG. 2, but of an alternative embodiment of the invention. DETAILED DESCRIPTION OF THE PREFERRED EMBODIMENT A multilayer sliding bearing constructed according to the invention is generally shown at 10 in FIG. 1 and is of the type having a generally semi-circular configuration commonly known in the art as half bearings, plain bearings, sliding bearings, journal bearings, engine bearings, and the like having a rigid metal backing 12 fabricated preferably of steel formed to a semi-circular strip configuration having a concave inner surface 14 and a convex outer surface 16. The convex outer surface 16 is adapted for seating in a mating concave support structure, such as an engine block or connecting rod, for journaled support of a rotating shaft, such as a crank shaft of an internal combustion engine. The term multilayer bearing is understood to include within its scope multilayer bushings.

It will be appreciated that FIG. 3 illustrates one of several possibilities of controlling the relative thicknesses and arrangement of the soft and hard layers to develop a desired macro hardness gradient in the overplate 122 across its thickness. It will be appreciated, of course, that other relative thicknesses and arrangements of the layers are possible and contemplated by the invention to develop the desired hardness gradient suitable for a particular application. For example, it may be desirable to vary the thicknesses of the soft layers 124 that separate the hard layers 126 to provide a sharper gradient or perhaps as an alternative to developing the same gradient as that achieved by altering the thicknesses of the hard layers. Moreover, it may be desirable in some applications to invert the gradient such that the overplate is harder in the top region as compared to the bottom region or perhaps somewhere in the middle as may be called for by a given application. In such case, the relative thicknesses of the alternating soft and hard layers can be adjusted to achieve the desired gradient.

According to a method of fabricating such multilayer bearings 10,110 of the invention, the base lining members 20,120 prepared according to conventional practice by bonding the metallic liner 18 to the inner-surface 14 of the backing 12 and then plating the liner 18 with the barrier layer 21,121 in preparation to receive the multi layer overplate 22. The overplate 22,122 is applied by electrodepositing the alternating the soft and hard layers in different plating baths at a given current density and for a given time to achieve the appropriate thicknesses desired for a given application to develop either a uniform hardness throughout the thickness of the overplate or a macro hardness gradient. In any case, the layers that make up the overplate 22,122 are free of lead.

Obviously, many modifications and variations of the present invention are possible in light of the above teachings. It is, therefore, to be understood that within the scope of the appended claims, the invention may be practiced otherwise then as specifically described.

What is claimed is:

1. A multilayer sliding bearing comprising:
   a base lining member including a rigid metal backing and a lining of bearing metal provided on said backing layer; and
   a lead-free multilayer overplate comprising a plurality of alternating soft and hard micro-thin overplate layers of lead-free metal materials electroplated onto said base lining member each having a thickness of about half or less of said overall thickness of said overplate.

2. The bearing of claim 1 wherein said lead-free soft material comprises tin and said lead-free hard material comprises at least one material selected from the group consisting of: nickel, copper, tin-nickel, cobalt, iron, and lead-free alloys thereof.

3. The bearing of claim 1 wherein said multilayer overplate has a top region adjacent a running surface of said bearing and a bottom region adjacent said liner, said multiple layers providing said overplate with an overall macro hardness gradient that increases in hardness from said top region to said bottom region such that the macro hardness of said top region is less than the macro hardness of said bottom region.

4. The bearing of claim 3 wherein said layers of said hard material in said top region of said overplate are relatively thinner than said layers of said hard material in said lower region.

5. The bearing of claim 4 wherein said overplate has an overall thickness in the range of about 10 to 20 $\mu$m and said layers of said hard material in said top region have a thickness of about 1 $\mu$m and said layers of said hard material in said bottom region have a thickness of about 2 $\mu$m.

6. The bearing of claim 5 wherein the layers of said soft material interposed between said layers of said hard material in said top and bottom regions are of uniform thickness in the range of about 1 to 2 $\mu$m.

7. The bearing of claim 6 wherein said soft layers include an outer-most layer in said top region of said overplate having a thickness in the range of about 1 to 5 $\mu$m.

8. The bearing of claim 1 wherein said bearing metal of said liner comprises a material selected from the group consisting of copper-lead and aluminum alloys.

9. A multilayer sliding bearing comprising:

a base lining member including a rigid metal backing and a liner of bearing metal provided on said backing layer; and a lead-free multilayer overplate applied to said base lining member having a plurality of lead-free soft layers of tin-based material separated by one or more intervening lead-free hard layers of at least one material selected from the group of materials consisting of nickel, copper, tin-nickel, cobalt, iron, and lead-free alloys thereof.

10. The bearing of claim 9 wherein said overplate has an overall thickness of about 10 to 20 $\mu$m and said alternating layers have thickness less than about 5 $\mu$m.

11. The bearing of claim 9 wherein said overplate has a top region adjacent a runner surface of said bearing and a bottom region adjacent said liner, and said multiple overplate layers are arranged to provide a macro hardness gradient in said overplate such that top portion of said gradient is relatively softer than said bottom portion.

12. The bearing of claim 11 wherein hard layers in said bottom region are of relatively greater thickness than said hard layers in said top region.

* * * * *

UNITED STATES PATENT AND TRADEMARK OFFICE
CERTIFICATE OF CORRECTION

PATENT NO. : 6,267,508 B1
DATED : July 31, 2001
INVENTOR(S) : Brian L. Bank, James R. Toth Page 1 of 1

It is certified that error appears in the above-identified patent and that said Letters Patent is hereby corrected as shown below:

<u>Column 2,</u>
Line 8, change "their exist they" to -- there exists the --.

Signed and Sealed this

Twenty-sixth Day of February, 2002

*Attest:*

*Attesting Officer*

JAMES E. ROGAN
*Director of the United States Patent and Trademark Office*